March 26, 1968     F. MAYER ET AL     3,375,423
SYNCHRONOUS MOTOR, ESPECIALLY FOR ELECTRIC CLOCKS
Filed June 1, 1965
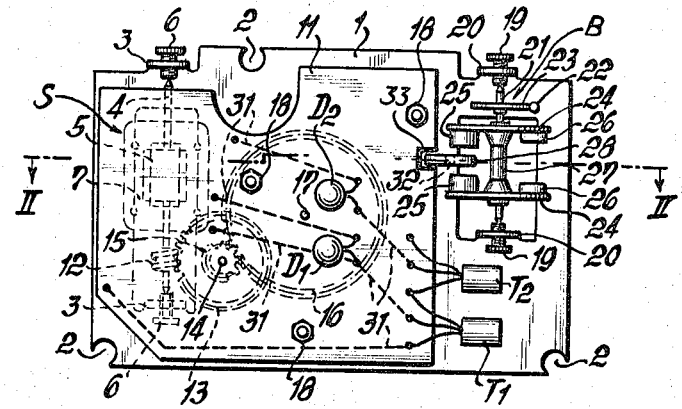
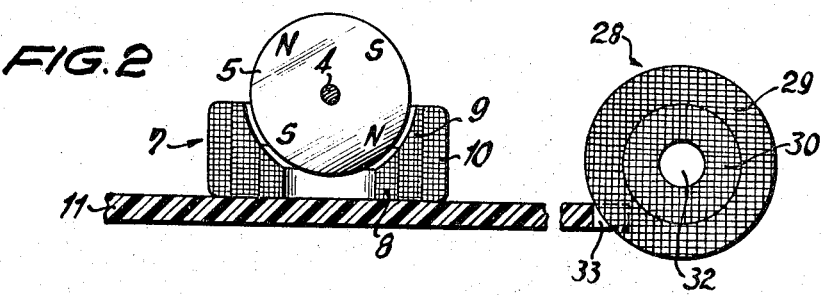
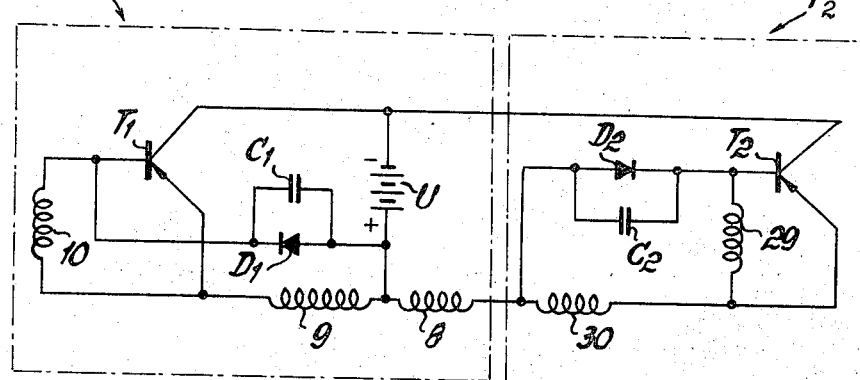
INVENTORS
Alfred MEISNER
Franz MAYER INVENTORS
Alfred MEISNER
Franz MAYER

United States Patent Office 3,375,423
Patented Mar. 26, 1968

3,375,423
SYNCHRONOUS MOTOR, ESPECIALLY
FOR ELECTRIC CLOCKS
Franz Mayer and Alfred Meisner, Nurnberg, Germany,
assignors to Diehl, Nurnberg, Germany
Filed June 1, 1965, Ser. No. 460,022
Claims priority, application Germany, June 5, 1964,
D 44,607
12 Claims. (Cl. 318—138)

ABSTRACT OF THE DISCLOSURE

Synchronous motor having a first driving coil to which the supply of driving pulses is under the control of the said motor and a second driving coil to which the supply of driving pulses is under the control of an oscillatory member independent of said motor.

---

The present invention relates to a synchronous motor, especially for driving an electric clock, having a permanent magnet rotor and at least one synchronizing coil driving the rotor. The synchronizing coil is charged with an impulse-like synchronizing voltage produced by a frequency standard while a dry battery serves as voltage supply source for the synchronous motor and the frequency standard.

Heretofore known synchronous motors have not met with success where a good degree of efficiency is important and where it is required that the motor operate unaffected by voltage and load variations, for instance as drive for an electric clock energized by a dry battery, inasmuch as they were unable to meet the requirements.

The degree of efficiency of a synchronous motor intended for driving a clock has to be at least 20% so that the clock runs for a sufficient length of time on one and the same battery. The known miniature synchronous motors, however, reach a maximum degree of efficiency of 6% and are, therefore, excluded from application for the above purpose. Furthermore, it is disadvantageous that synchronous motors of this type have to have a rotor with a relatively great moment of inertia when running in so-called impulse operation as is customary with timekeeping instruments. This is necessary in order to bridge the time during which no drive impulse acts upon the rotor. A synchronous motor of the above described type reaches its synchronous speed only slowly and in an oscillating manner and, with the heretofore known synchronizing circuits, falls out of step very easily if variations in the supply voltage and in the load occur.

It is, therefore, an object of the present invention to provide a synchronous motor, especially for driving an electric clock, having a permanent magnet rotor and at least one synchronizing coil driving said rotor, which will overcome the above mentioned drawbacks.

It is a further object of the present invention to provide a synchronous motor of the type set forth in the preceding paragraph, which has a good degree of efficiency.

A still further object of the present invention consists in the provision of a motor of the type set forth in the preceding paragraphs, which does not fall out of step even with greater variations in voltage and load.

Still another object of the present invention consists in the provision of a synchronous motor which reaches its synchronous speed after only a few revolutions.

These and other objects and advantages of the invention will appear more clearly from the following specification in connection with the accompanying drawings, in which:

FIG. 1 illustrates an electric clockwork with a synchronous motor according to the present invention and with a balance oscillator serving as control means.

FIG. 2 is a section taken along the line II—II of FIG. 1.

FIG. 3 illustrates the electric circuit of the clockwork according to the present invention.

Figure 4:
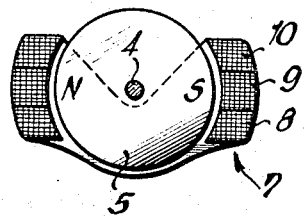
FIG. 4 shows a synchronous motor according to the present invention, modified over that shown in FIGS. 1 and 2 in that it is provided with a bi-polar rotor.

The synchronous motor according to the present invention is characterized primarily by a drive coil in addition to the synchronizing coil referred to above. This drive coil is, for purposes of driving the rotor, adapted to be connected to a direct current source, especially a dry battery, by means of a switch controlled by the rotor. The drive impulses passing through the drive coil and preferably produced without contact, thus act upon the rotor in a driving manner in the same way as the synchronizing impulses. The moment of inertia of the rotor can be kept very small inasmuch as during one revolution several driving impulses act upon the rotor, namely, synchronizing impulses and drive impulses produced by the rotor.

Advantageously, the synchronizing coil and the drive coil are so poled and arranged, and the phase of the voltage charging the drive coil is with regard to the synchronizing voltage so selected that alternately a synchronizing impulse of the synchronizing coil and a drive impulse of the drive coil drivingly acts upon the rotor.

The degree of efficiency of the synchronous motor according to the present invention is, with preselected frequency of the synchronizing voltage, dependent on the dimensions of the rotor and of the stationary part of the motor. Experiments have shown that the degree of efficiency reaches its maximum value if the rotor is so designed with regard to its geometrical dimensions, its moment of inertia and its magnetic flux, and the synchronizing coil is so designed that the quenching frequency of the rotor penetrated by the magnetic field of the synchronizing coil is approximately equal to the frequency of the synchronizing voltage.

The synchronization of the motor may be effected by an oscillator which, in a manner known per se, is provided with at least one permanent magnet which induces periodic control impulses in a stationary control coil, said control impulses being fed as drive impulses, following amplification in an electronic stage, to a drive coil driving the oscillator while the synchronizing coil of the motor is arranged in series with the drive coil of the oscillator. The working voltage of the oscillator partly serves as synchronizing voltage so that the motor runs with a speed which is in conformity with the frequency of the oscillator.

Referring now to the drawings in detail and FIGS. 1 to 3 in particular, the clockwork shown therein comprises a plate 1 provided with recesses 2 serving for fastening the clockwork. Plate 1 is furthermore provided with two ears 3 having screwed therein two screws 6 rotatably supporting a shaft 4. Shaft 4 has fixedly connected thereto a cylindrical four-polar permanent magnet armature 5 of a synchronous motor generally designated with the reference character S. The synchronous motor S is furthermore provided with a non-ferrous stator winding 7 comprising a synchronizing coil 8, a drive coil 9 and a control coil 10.

The arrangement of coils 8, 9 and 10 is illustrated in detail in FIG. 2. As is furthermore shown in FIG. 2, stator winding 7 is glued to a plate 11 consisting of insulating material and connected to plate 1 by means of studs 18. Shaft 4 of the synchronous motor has keyed thereto a worm 12 meshing with a gear 13 the shaft 14 of which is journalled in plates 1 and 11. Shaft 14 carries a pinion 15 meshing with a gear 16 the shaft 17 of which forms the seconds shaft of the clock. The drive for the minutes and hours wheel of the clock is effected in a manner known per se through the intervention of a gear stepdown transmission (not shown).

The clockwork of FIG. 1 furthermore comprises a balance oscillator B comprising a shaft 21 journalled in two bearing screws 19 screwed into ears 20 of plate 1. Shaft 21 is engaged by a spiral spring 23 which is fixedly held by a little block 22 in a bore of plate 1. Balance oscillator B is furthermore provided with two round pole plates 24 having connected thereto two tablet-shaped permanent magnets 25 located opposite to each other and also two balancing masses 26 located opposite to each other. A soft metal magnet spacer bolt 27 serves as magnetic grounding means for the field of magnets 25, which field is intersected by a stationary winding 28 having a central bore 32 and comprising a control coil 29 and a drive coil 30 (FIG. 3). Coils 29 and 30 are arranged concentrically with regard to each other, with the control coil 29 being located on the outside. Winding 28 is arranged in a recess 33 of plate 11 and is glued thereto.

Plate 11 which is made of insulating material, as mentioned above, serves as carrier plate for the electrical control elements $D_1$, $T_1$ for the motor and $D_2$, $T_2$ for the balance oscillator. Control elements $D_1$, $T_1$, $D_2$, $T_2$ and the windings 7, 28 consisting of the coils 8, 9, 10 and 29, 30 are interconnected by a printed circuit on plate 11. For this purpose, on one side of plate 11 there are provided conductive lines 31 with soldered supporting points to which are connected the elements $D_1$, $D_2$, $T_1$, $T_2$, 7 and 28. Controls elements $D_1$, $D_2$, $T_1$, $T_2$ are located on the other side of plate 11 while their connecting wires are passed through holes provided in plate 11.

FIG. 3 illustrates in the left-hand portion $P_1$ the circuit of the motor and in the right-hand portion $P_2$ the circuit of the oscillator. The transistors $T_1$ for the motor and $T_2$ for the oscillator operate in an emitter circuit. Control coil 10 of the motor is located between the base and the emitter of transistor $T_1$, while between the collector and the emitter of transistor $T_1$ there is arranged the series connection of a direct current source U and the drive coil 9 of the motor. Direct current source U is also connected to the collector of transistor $T_2$ and through the intervention of the synchronizing coil 8 and the drive coil 30 of oscillator B to the emitter of transistor $T_2$. Control coil 29 of the oscillator B is located between the base and the emitter of transistor $T_2$. Diode $D_1$ is connected to the base of transistor $T_1$ and to the positive pole of current source U, whereas diode $D_2$ is connected to the base of transistor $T_2$ and that end of drive coil 30 which is connected to the synchronizing coil 8. Diodes $D_1$, $D_2$ serve for compensating the influence of variations in the voltage of direct current source U on the two transistor elements. For purposes of preventing self-oscillation of the transistor elements, condensers $C_1$, $C_2$ are arranged parallel to the diodes $D_1$, $D_2$. It is, however, to be understood that the circuit arrangement according to the present invention is also operable without condensers $C_1$, $C_2$ if diodes are employed the capacity of which is sufficient for eliminating a self-oscillation of the transistors.

During half a revolution of armature 5 an impulse-like control voltage with a positive and a negative half-wave is induced in motor control coil 10 inasmuch as the armature 5 has four poles (see FIG. 2). Transistors $T_1$, $T_2$ are designed as PNP-transistors so that the negative half-wave of the control voltage induced in coil 10 is amplified in transistor $T_1$ and flows through the drive coil 9 as drive impulse. Thus, two drive impulses of drive coil 9 act per revolution on rotor 4, 5. It is, of course, to be understood that instead of the two PNP-transistors, also two NPN-transistors or one PNP-transistor plus one NPN-transistor may be employed while the polarity of the impulses or of the current source U will be changed accordingly.

Balance oscillator B induces in a manner known per se with each half-oscillation two control impulses of opposite polarity in the annular control coil 29 inasmuch as each winding of coil 29 intersects twice the magnetic flux of magnets 25, when the latter move over winding 28. However, only the negative impulses are amplified and, therefore, with each complete oscillation two drive impulses are produced in drive coil 30.

Since the synchronizing coil 8 is arranged in series with the drive coil 30 of the balance oscillator, also coil 8 is charged with a portion of the drive voltage. The magnitude of this voltage depends on the dimensions of coils 8 and 30. Thus, the drive impulses of oscillator B act through the intervention of synchronizing coil 8 as additional drive impulses on rotor 4, 5 and determine the speed of the latter. In the embodiment according to FIGS. 1 to 3, the synchronous motor S and the balance oscillator B are so tuned and the coils are so poled and dimensioned that alternately a synchronzing impulse of synchronizing coil 8 and a drive impulse of motor drive coil 9 act in a driving manner on rotor 4, 5. Accordingly, the synchronizing impulse has, with regard to the drive impulse in coil 9, a phase displacement of 90°. Coils 8, 9 are poled in such a way that the magnetic field of synchronizing coil 8 has a polarity which is opposite to that of the magnetic field of drive coil 9. During one revolution four drive impulses act upon rotor 4, 5, viz. two impulses of coil 9 and two impulses of coil 8.

Advantageously, the motor is so designed that its speed of autorotation (Eigendrehzahl) is approximately equal to the synchronous speed. In view of its own drive, the motor may easily be synchronized, reaches its synchronous speed already after few revolutions, and is nonsensitive to variations in load. The degree of efficiency of the clock drive according to FIGS. 1 to 3 is so high that it runs for at least a year on one 1.5 v. mono-cell. Tests have shown that it is advantageous to design the motor drive coil 9, synchronizing coil 8 and drive coil 30 of the oscillator B in such a way that the fluxes of these coils are approximately equal.

In order to compensate for the effect of variations in voltage of direct current source U on the collector current of transistors $T_1$, $T_2$, diodes $D_1$, $D_2$ are poled in the same direction as the base-emitter connection of the respective transistor and are located between the base of the respective transistor and one point of the working circuit, as described above. Each of the diodes $D_1$, $D_2$ is charged with a voltage depending on the working current, when transistor $T_1$, $T_2$ is opened. Beyond a lower limit value of the working current and thereby of the voltage of direct current source U, the diodes $D_1$, $D_2$ become conductive in view of an abrupt change in their current-voltage characteristic and form a relatively low ohmic shunt with regard to the emitter-base-connection of the corresponding transistor $T_1$, $T_2$. Furthermore, diodes $D_1$, $D_2$ charge the base of transistor $T_1$ and the base of transistor $T_2$ with a blocking potential (Sperrpotential) which is the higher the greater the current in the working circuit of the transistor. In this way, the working current of the transistors $T_1$, $T_2$ is, beyond a certain predetermined lower limit voltage of current source U, held constant for all practical purposes over a wide range while variations in voltage of current source U have practically no effect on the two transistor amplifiers within this range.

Due to the voltage stabilization effected by the diodes $D_1$, $D_2$, the synchronous motor S practically causes no reaction in the balance oscillator B so that the latter may oscillate almost completely freely and so that its isochronism is very good. This is due to the fact that voltage impulses induced by the armature 5 of motor S in synchronizing coil 8 located in the working circuit of the balance oscillator B act as variations in voltage of current source U on transistor T while these variations in voltage are eliminated by diode D$_2$. Thus, these voltage impulses have no influence on the working current of transistor T$_2$.

A further embodiment of the synchronous motor according to the present invention is illustrated in FIG. 4, in which synchronizing coil 8, drive coil 9 and control coil 10 are designed as O-shaped air coils enclosing the two-pole armature 5 of the rotor. That portion of stator winding 7 which intersects the magnetic flux of armature 5 is, in all positions of rotor 4, 5 located symmetrically with regard to the connecting line of the poles of armature 5. Stator winding 7 is cranked rearwardly at its upper and lower end faces and is passed by shaft 4 in such a way that the latter is not hindered in its movement by stator winding 7. Stator winding 7 is in a suitable manner connected to plate 11, for instance by gluing.

Figure 5:
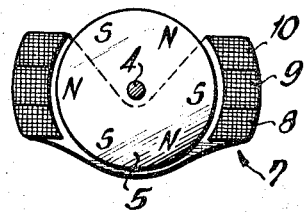
FIG. 5 shows a further modification of the synchronous motor according to the present invention, with a six-polar rotor.

FIG. 5 illustrates a further embodiment of the synchronous motor according to the present invention. The armature 5 of this motor has six poles while its stator winding 7 is designed in the same manner as that of FIG. 4.

Figure 6:
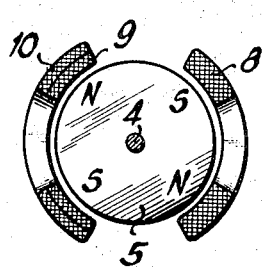
FIGS. 6 and 7 illustrate in section and elevation respectively a further modification of a synchronous motor according to the present invention.
Figure 7:
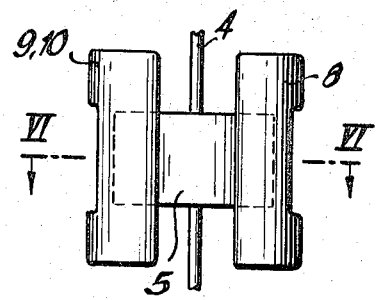

In the embodiment of FIGS. 6 and 7 control coil 10 and drive coil 9 are arranged on one side of the four-polar armature 5 and synchronizing coil 8 on the other side thereof. This particular embodiment yields the advantage that the air gap between the driving coils 8 and 9 and the armature 5 can be kept very small.

While the stator coils 8, 9, 10 are shown in the drawings as separate windings, it is, of course, to be understood that these windings may be intertwined, i.e., during the winding operation the wires may be guided parallel to each other. In all instances, it is advantageous so to pole and arrange coils 8, 9 and 10 and so to select the phase of the synchronizing voltage with regard to the voltage at drive coil 9 that the rotor is alternately subjected to a synchronizing impulse and to a drive impulse of coil 9.

Experience has shown that the degree of efficiency of the synchronous motor according to the present invention depends to a large extent on the frequency of the synchronizing voltage, on the dimensions of the synchronizing coil 8 and on the design of rotor 4, 5 with respect to its geometric dimensions, its moment of inertia, and its magnetic flux. If it is assumed that synchronizing coil 10 is passed through by a constant direct current the magnitude of which equals the effective value of the synchronizing voltage, the rotor oscillates about its rest position when it is subjected to a mechanical impulse. For small angles of rotation the period of oscillation T of the oscillating rotor amounts to $$T = 2\pi\sqrt{\frac{J}{M_{mgn}\cdot H}}$$

in which J represents the moment of inertia of the rotor, H the magnetic field intensity of the synchronizing coil, and M$_{mgn}$ the magnetic moment of the rotor.

The magnetic moment equals: $M_{mgn}=B\cdot V$, in which B is the magnetic flux density and V the volume of the rotor.

In order to obtain a high degree of efficiency of the synchronous motor, the rotor and the synchronizing coil have to be so dimensioned that the pendulum frequency (1/T) (Pendelfrequenz) of the rotor oscillating in the magnetic field of the synchronizing coil is approximately equal to the frequency of the synchronizing voltage. The frequency range in which the optimum degree of efficiency is obtained is relatively wide so that it is sufficient to so dimension the motor that the above-mentioned two frequencies are approximately the same.

In the synchronous motor according to the present invention, a balance oscillator serves for synchronizing purposes. It is, however, to be understood that also other time or frequency standards may be employed. Torsion spring oscillators, leaf spring oscillators, piezo-electric oscillators are particularly suitable. Inasmuch as the frequency of the synchronizing voltage is relatively high in some instances, especially if piezo-electric oscillators are involved, it is advantageous to provide the motor with a four-pole armature, for instance according to FIG. 5, in these particular instances. In this way, the speed of the motor is kept relatively low so that also the losses in the gear transmission are relatively small.

The synchronous motor according to the present invention does not fall out of step if the frequency of the synchronizing voltage varies within relatively wide limits. It is, therefore, possible to control the motor speed by varying the frequency of the synchronizing voltage.

It is, of course, to be understood that the present invention is, by no means, limited to the particular constructions shown in the drawings, but also comprises any modifications within the scope of the appended claims. Thus, while the invention has been described in connection with a drive for a clock, it is to be understood that the synchronous motor is also very suitable for other purposes, as, for instance, as drive motor for a portable record player which is likewise energized by a dry battery.

What we claim is:

1. A synchronous motor, especially for driving an electric clock, which comprises: a permanent magnet rotor; and control circuit means for controlling said rotor; said circuit means including a direct current source and a synchronizing coil operable when supplied with current pulses from said source to drive said rotor; said circuit means also including drive coil means operable when supplied with current pulses from said source to drive said rotor and furthermore including first switch means controlled by said rotor and operable periodically to establish and interrupt electric connection between said drive coil means and said direct current source, an oscillatory member separate from said rotor and comprising a permanent magnet, a second driving coil and a second switch means in said circuit means, said second switch means being controlled by said oscillatory member periodically to effect the connection of said second drive coil to said source, said synchronizing coil being connected to receive current from said source simultaneously with said second driving coil.

2. An arrangement according to claim 1, in which said first and second switch means consists of electronic switch means.

3. A synchronous motor, especially for driving an electric clock, which comprises: a permanent magnet rotor; and control circuit means for controlling said rotor; said circuit means including a direct current source and a synchronizing coil operable when supplied with current pulses from said source to drive said rotor; said circuit means also including drive coil means operable when supplied with current pulses from said source to drive said rotor and furthermore including transistor means operable periodically to establish and interrupt electric connection between said drive coil means and said direct current source; said circuit means furthermore including control coil means operable to control said transistor means and inductively connected to said rotor to enable the latter periodically to induce control impulses in said control coil means, an oscillatory member separate from said rotor, said circuit means including a second drive coil for said oscillatory member and a second control coil under the influence of said oscillatory member to effect periodic electrical connection of said source with said second driving coil to drive said oscillatory member, said synchronizing coil being connected to receive current from said source simultaneously with said second driving coil.

4. A synchronous motor according to claim 3, in which the synchronizing coil and the drive coil means are so poled and arranged and the phase displacement of the voltage on the drive coil means and the synchronizing coil is so selected that said rotor is alternately subjected to a synchronizing impulse of said synchronizing coil and to a driving impulse of said drive coil means.

5. A synchronous motor, especially for driving an electric clock, which comprises: a permanent magnet rotor; and control circuit means for controlling said rotor; said circuit means including a direct current source and a synchronizing coil operable when supplied with current pulses from said source to drive said rotor, said circuit means also including drive coil means operable when supplied with current pulses from said source to drive said rotor and furthermore including transistor means operable periodically to establish and interrupt electric connection between said drive coil means and said direct current source; said circuit means furthermore including control coil means operable to control said transistor means and inductively connected to said rotor to enable the latter periodically to induce control impulses in said control coil means, an oscillatory member separate from said rotor, said circuit means including a second drive coil for said oscillatory member and a second control coil under the influence of said oscillatory member to effect periodic electrical connection of said source with said second driving coil to drive said oscillatory member, said synchronizing coil being connected to receive current from said source simultaneously with said second driving coil, said control coil means and said drive coil means and said synchronizing coil being designed as O-shaped air core coils forming a stator at least partially surrounding said rotor; said rotor comprising a cylindrical permanent magnet armature with at least two circumferentially spaced poles and a shaft supporting said armature, said shaft being so located with regard to said O-shaped stator that the lines of force of said armature during the rotation of the latter will be intersected perpendicularly by the coils of said stator.

6. An arrangement according to claim 5, in which said control coil means and said drive coil means are arranged concentrically one within the other while said control coil means is located on the outside and said synchronizing coil is located on the inside.

7. An arrangement according to claim 1, in which said rotor is so selected with regard to its geometrical dimensions and with regard to its inertia and its magnetic flux while said synchronizing coil is so dimensioned that the pendulum friction of the rotor penetrated by the magnetic field of said synchronizing coil means approximately equals the frequency of the synchronizing voltage.

8. A synchronous motor, especially for driving an electric clock, which comprises: a permanent magnet rotor; and control circuit means for controlling said rotor; said control circuit means including a direct current source and a synchronizing coil operable when supplied with current pulses from said source to drive said rotor; said circuit means also including first drive coil means operable when supplied with current pulses from said source to drive said rotor and furthermore including first control coil means inductively connected to said rotor to enable the latter periodically to induce periodic impulses in said control coil means; first switch means controlled by said first control coil means for electrically connecting said source to said first drive coil means; said circuit means also including oscillator means provided with at least one permanent magnet and a second drive coil means and a second control coil means, said permanent magnet being operable for periodically inducing control impulses in said second control coil means, electronic switch means electrically connected to said second control coil means for receiving control impulses induced in said second control coil means and operable to electrically connect said second driving coil means to said source, said second drive coil means being arranged in series with said synchronizing coil means so that both thereof receive current from said source at the same time.

9. A synchronous motor according to claim 8, in which the first driving coil means for said rotor and the synchronizing coil means and the second driving coil means for said oscillator means are so dimensioned that the flux through said last-mentioned three coil means is substantially the same.

10. A synchronous motor, especially for driving an electric clock, having a permanent magnet rotor and control circuit means for said rotor, said control circuit means including: synchronizing coil means electromagnetically connected to said rotor for driving the same, first control coil means arranged within the magnetic range of said rotor, said rotor being operable periodically to induce control impulses in said control coil means, first transistor means connected to said first control coil means to receive impulses therefrom and to amplify the same, first driving coil means operable to exert a driving force on said rotor, oscillator means for periodically inducing control impulses in said first control coil means, second driving coil means for driving said oscillator means, a direct current source, second transistor means associated with said oscillator means for controlling the latter, and second control coil means for controlling said oscillator means, the arrangement being such that said first control coil means is located between the base and the emitter of said first transistor means, and that said direct current source and said first driving coil means are arranged in series and between the emitter and the collector of said first transistor means, said second control coil means being interposed between and connected to the base and the emitter of said second transistor means while said second driving coil means and said synchronizing coil means and said direct current source are arranged in series with each other and are interposed between and connected to the emitter and the collector of said second transistor means, a first diode interposed between and connected to the base of said first transistor means on one hand and the connecting point between said synchronizing coil means and said driving coil means the other hand for eliminating voltage variations of said direct current source, a second diode interposed between and connected to the base of said second transistor means on one hand and that end of said second driving coil means which is connected to said synchronizing coil means on the other hand, said two diodes being poled in the emitter-base direction of the respective transistor pertaining thereto, said diodes above a certain limit voltage of said direct current source forming a shunt of relatively low ohmic resistance with regard to the emitter-base section of the respective transistor.

11. An arrangement according to claim 10, which includes two condensers respectively arranged in parallel to said diodes for preventing self-oscillations of said first and second transistors.

12. An arrangement according to claim 10, which includes plate means of insulating material having printed thereon the circuit for and supporting said first and second transistor means and said diodes and said first control coil means as well as said first driving coil means and said synchronizing coil means.

References Cited

UNITED STATES PATENTS

| | | | |
|---|---|---|---|
| 3,067,370 | 12/1962 | Quittner | 318—138 X |
| 3,134,220 | 5/1964 | Meisner | 318—138 X |
| 3,142,012 | 7/1964 | Petrides | 318—138 |
| 3,168,689 | 2/1965 | Gelenius | 318—138 X |
| 3,168,690 | 2/1965 | Lavet | 318—132 X |
| 3,268,786 | 8/1966 | Reich | 318—132 X |
| 3,274,470 | 9/1966 | Gershen | 318—138 |

ORIS L. RADER, *Primary Examiner.*

G. SIMMONS, *Assistant Examiner.*